United States Patent
Neal

(12) United States Patent (10) Patent No.: US 6,510,777 B2
Neal (45) Date of Patent: *Jan. 28, 2003

(54) ENCAPSULATED IMBRICATED ARMOR SYSTEM

(75) Inventor: Murray L. Neal, Fresno, CA (US)

(73) Assignee: Pinnacle Armor, LLC, Fresno, CA (US)

(*) Notice: Subject to any disclaimer, the term of this patent is extended or adjusted under 35 U.S.C. 154(b) by 125 days.

This patent is subject to a terminal disclaimer.

(21) Appl. No.: 09/754,414

(22) Filed: Jan. 2, 2001

(65) Prior Publication Data

US 2001/0015157 A1 Aug. 23, 2001

Related U.S. Application Data

(63) Continuation-in-part of application No. 09/302,734, filed on Apr. 30, 1999, now Pat. No. 6,035,438, and a continuation-in-part of application No. 09/513,563, filed on Feb. 25, 2000.

(51) Int. Cl.[7] ............................................. F41H 5/08
(52) U.S. Cl. ..................... 89/36.05; 89/36.01; 2/2.5; 428/911
(58) Field of Search ........................ 89/36.05, 36.01, 89/36.07; 2/2.5; 428/911, 101

(56) References Cited

U.S. PATENT DOCUMENTS

| | | | |
|---|---|---|---|
| 921,352 A | 5/1909 | Blaker et al. | |
| 1,021,804 A | 4/1912 | Schneider | |
| 1,282,411 A | 10/1918 | Golembiowski | |
| 1,290,799 A | 1/1919 | Talley | |
| 1,513,766 A | 11/1924 | Spooner | |
| 1,739,112 A | 12/1929 | Wisbrod | |
| 3,179,553 A | 4/1965 | Franklin | |
| 3,563,836 A | 2/1971 | Dunbar | |
| 3,813,281 A | 5/1974 | Burgess et al. | |
| 3,829,899 A | 8/1974 | Davis | |
| 3,867,239 A | 2/1975 | Alesi et al. | |
| 4,633,756 A | 1/1987 | Rudoi | |
| 4,648,136 A | 3/1987 | Higuchi | |
| 5,196,252 A | 3/1993 | Harpell | |
| 5,326,606 A | 7/1994 | Labock | |
| 5,443,917 A | 8/1995 | Tarry | |
| 5,515,541 A | 5/1996 | Sacks et al. | |
| 5,738,925 A | 4/1998 | Chaput | |
| 5,824,940 A | 10/1998 | Chediak et al. | |
| 5,996,115 A | 12/1999 | Mazelsky | |
| 6,035,438 A | * 3/2000 | Neal et al. .................... | 2/2.5 |

FOREIGN PATENT DOCUMENTS

EP W 091/06 823 6/1991

OTHER PUBLICATIONS

X–2 Promotional Materials; Bain, Allan D.; Jan. 1996.

* cited by examiner

*Primary Examiner*—J. Woodrow Eldred
(74) *Attorney, Agent, or Firm*—Blakely, Sokoloff, Taylor & Zafman, LLP

(57) ABSTRACT

An armoring system for vehicles, vessels, aircraft and structures. A plurality of discus-shaped disks are individually wrapped in a containment wrap. The wrapped disks are laid out in an imbricated pattern and adhered in place between a pair of fibrous layers. In one embodiment an elastomer layer is used to seal the panel to prevent degradation from exposure to environmental factors.

15 Claims, 1 Drawing Sheet

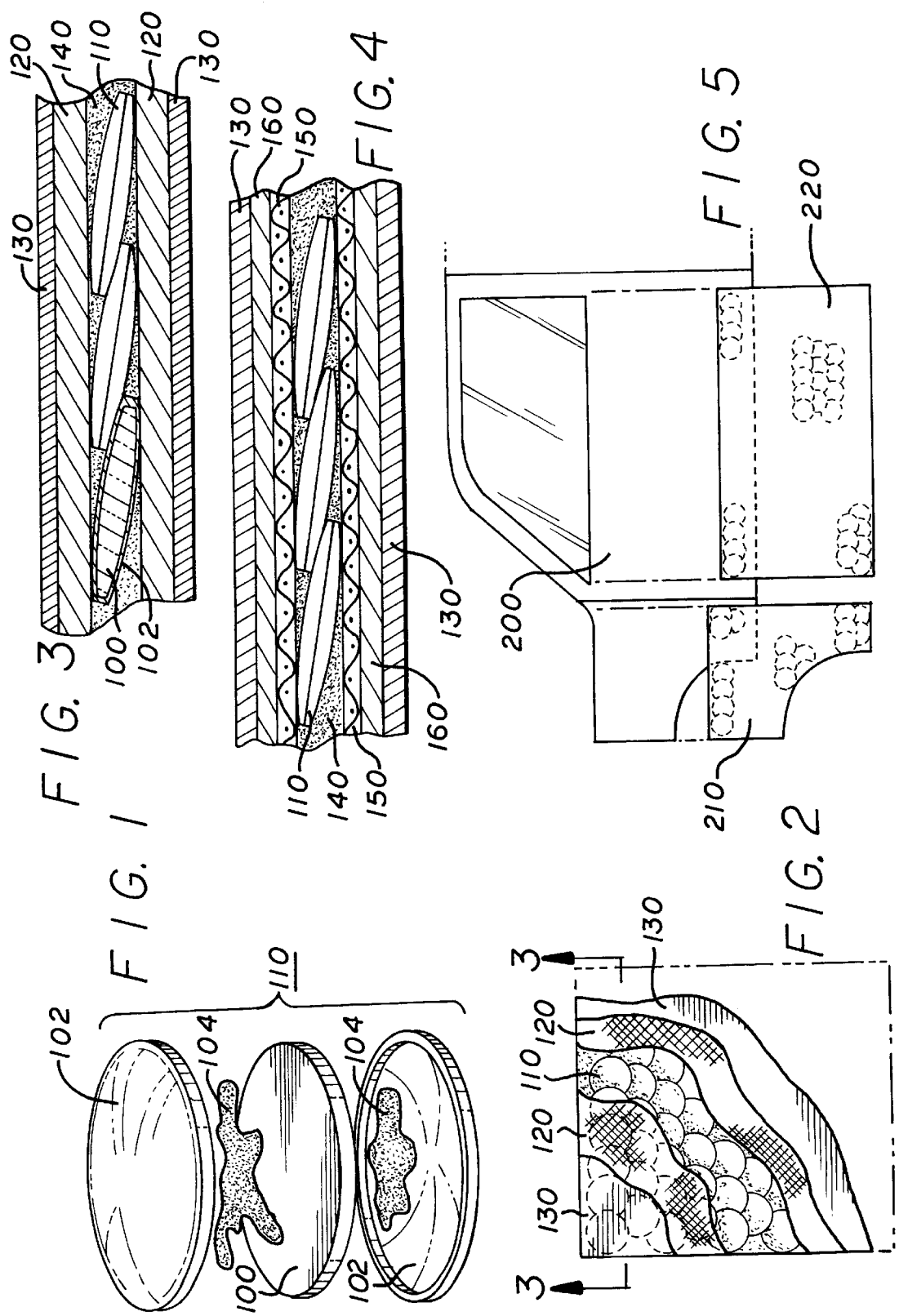

ENCAPSULATED IMBRICATED ARMOR SYSTEM

CROSS REFERENCE TO RELATED APPLICATION

This application is a continuation in part of U.S. patent application Ser. No. 09/302,734, filed Apr. 30, 1999, issued as U.S. Pat. No. 6,035,438 on Mar. 14, 2000 and U.S. patent application Ser. No. 09/513,563, filed Feb. 25, 2000 pending.

BACKGROUND (1) Field of the Invention

The invention relates to armor systems. More specifically, the invention relates to armoring systems suitable for armoring vehicles, vessels, aircraft and structures.

(2) Background

Various vehicles, vessels and aircraft are subjected to a wide variety of threats ranging from small arms fire up to 30 millimeter cannons. Various armor systems have been employed to mitigate these threats with varying degrees of success. Typical existing armor for vehicles, vessels and aircraft employ rigid monolithic plates of either steel or ceramic construction. These types of passive armor rely on thickness and toughness to prevent penetration of ballistic projectiles. Because such monolithic plates tend to have poor repeat-hit characteristics, and because they tend to be relatively heavy, they are often in relatively small sections, such as 10"×20" squares, which are then bolted to the vehicle, vessel or aircraft to be armored. When a ballistic projectile strikes one of these plates, it tends to cause significant cracking and damage throughout the plate. Thus, on subsequent hits there is less armor to prevent penetration. The net result is that such plates have a maximum of three high power rifle shot repeat-hit capability under current technology. Based upon the caliber and projectile configuration, large calibers typically totally destroy three to five inch areas during the ballistic event, with a non-effective repeat hit area distributed radially outward in distance encompassing an area of twice the initially destroyed impact area. Problems also arise as a result of the conditions under which the armor is required to function. These conditions include a wide array of temperatures, abusive impact and extensive ultraviolet (UV) and chemical exposures.

BRIEF SUMMARY OF THE INVENTION

An armoring system for vehicles, vessels, aircraft and structures. A plurality of discus-shaped disks are individually wrapped in a containment wrap. The wrapped disks are laid out in an imbricated pattern and adhered in place between a pair of fibrous layers. In one embodiment an elastomer layer is used to seal the panel to prevent degradation from exposure to environmental factors.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 1 is an exploded view of a wrapped disk for use in one embodiment of the invention.

FIG. 2 is a partial view of an armor unit of one embodiment of the invention.

FIG. 3 is a sectional view of the armor system of one embodiment of the invention.

FIG. 4 is a sectional view of an alternative embodiment of the invention.

FIG. 5 is a schematic view of a vehicle side section to be armored.

DETAILED DESCRIPTION

FIG. 1 is an exploded view of a wrapped disk for use in one embodiment of the invention. A discus-shaped disk 100 is formed of a high hardness material and may be manufactured out of various ceramic materials, or for example, powered titanium. By "discus-shape" it is meant that the disk is thicker in the center tapering to the edges. For most applications, the disks will have a center thickness in the range of 9–20 mm. Typically, the disks will be approximately half the center thickness at the edges. The disks are typically between 1.5" and 4.5" in diameter. Larger diameter disks are used for armoring generally flat surfaces, while smaller diameter disks are used where greater surface contour is desirable. Diameters of 2" are preferred for level IV threats as defined by the National Institute of Justice (NIJ) and 3" diameters are preferred for threats from 50 caliber to 30 mm cannon.

A number of possible ceramic composites have been found suitable as high hardness materials for the disk 100. These include fiber induced ceramics sold under the trademarks SINTOX® FA and DERANOX® by Morgan Matroc, Ltd. of Bedforshire, England. In particular, SINTOX® FA alumina oxide ceramic and DERANOX® D995L, for a zirconia toughened alumina oxide ceramic composite, composed of approximately 88% by weight alumina plus approximately 12% by weight transformation toughened zirconia (TTZ), have proven suitable ceramic composites.

In addition to alumina based composites, other bases may be utilized to form the ceramic composite including barium titanate, strotium titanate, calcium zirconate, magnesium zirconate, silicon carbides and boron carbides. As indicated, these potential ceramic bases are not limited to oxide ceramics but also include mixed oxides, non-oxides, silicates as well as MICATHERM® ceramics, (the latter being a trademark for inorganic thermoplastic materials sold by Morgan Matroc, Ltd. of Bedforshire, England).

Suitable ceramic composites have relatively high hardness and fracture toughness. Typically, such materials have at least approximately 12 GPa in hardness and at least 3.5 MPa $m^{1/2}$ in fracture toughness. Ultimately, hardness and fracture toughness levels will depend on the type of ceramic composite employed. For exemplary embodiments of the present invention using alumina bases, the fracture toughness minimum for alumina would be 3.8 MPa $m^{1/2}$ and 4.5 MPa $m^{1/2}$ for zirconia toughened alumina. The hardness for alumina would be in the approximate range of 12 to 15 GPa, and for zirconia toughened alumina, the hardness would be at least approximately 15 GPa.

In certain instances, the ceramics employed may be supplemented by the addition of a toughening agent such as toughened metallic oxides. In one embodiment, TTZ is added to the alumina base. The inclusion of metallic oxides increase the strength of the resulting ceramic composite and resist disassociation of the disk upon impact during a ballistic event. For alumina based ceramic composites, the range of TTZ percentage by weight for suitable ballistic grade ceramics would be between 0.05% and 20%. In one embodiment the percentage of TTZ by weight to the alumina base is approximately 12% of the composite.

The ceramics are mixed in ways commonly known in the art. Sintering and molding, including injection molding, methods to form the disk are well known in the art. In one embodiment, the disks may be formed by injection molding and then pressing to the desired shape.

The discus-shaped disk 100 is adhered to a first and second half of a wrap 102 by an adhesive 104. Adhesive 104 all typically fall into one of two classes: either it will be a very high-modulus adhesive with no stretch that dries very hard, or it will be a low-modulus elastic adhesive composition that cushions and absorbs shock. The selection of the adhesive affects the transfer of sonic shock from one medium to another during a ballistic event. Selection of the adhesive depends on the desirability of allowing the sonic shock wave to transfer between mediums. In one embodiment the wrap 102 is titanium. After adherence to the disk 100 two halves of wrap 102 are robotically welded together along the seam between them. In one embodiment, an electron beam method is used to weld the two halves without added weight. Prior to the welding, the titanium wrap 102 may be heat treated. The wrap will generally have a thickness in the range of 0.020" to 0.080". A thicker wrap requires a faster dropping radius of the underlying disk to insure a desired slope of the wrapped disk.

While it is within the scope and contemplation to use the titanium wrap in an annealed state, for some applications the annealed state is too ductile and not sufficiently hard. In the heat-treated state, the titanium is significantly harder, but it will still stretch a little. With the heat-treated titanium on the occurrence of a ballistic event, it takes longer to get the titanium wrap to stretch. Instead, on impact it stretches a little bit and bulges with little frontal surface damage. More rapid stretching can lead to a reverse crater and stress cracks. It is desirable that following a ballistic event as much ceramic as possible is retained within the wrap, to improve the repeat-hit capability. Because the broken ceramic pieces cannot fall out of the titanium wrap, the broken pieces impede subsequent projectiles.

In an alternative embodiment, the wrap may be aramid fiber adhered to envelope the individual disks. In such embodiment it is necessary that the wrap extend to cover the edges of the disk to prevent the ceramic from squeezing out the sides responsive to a ballistic event. It has been found that a titanium wrap results in a 28% better response to ballistic events.

FIG. 2 is a partial view of an armor unit of one embodiment of the invention. A plurality of wrapped disks 110 are laid out in an imbricated pattern formed by laying out a plurality of substantially horizontal overlapping rows of individual disks 110. To arrange the imbricated pattern, the disks are typically laid out from left to right. Each subsequent row is also laid out left to right. It has been found that switching from left to right, then to right to left, creates weakness in the resulting pattern that often causes failure. Disks within each row form a substantially straight horizontal line. Because the disks overlap, each disk lies on a slight tilting slope relative to a line normal to the horizontal layout surface. In one embodiment, this slight slope of the disks complements their inclined discus shape to increase the probability of impact deflection. The imbricated patterns are then adhered in place by sandwiching it between fibrous layers 120. The overlap of the imbricated pattern has been found to effectively spread the force of a high-velocity projectile hit to adjacent disks, thereby preventing penetration and backside deformation. Additionally, because of the slight tilt of each overlapping disk in the imbricated pattern, a perpendicular hit is very unlikely and some of the energy will be absorbed in deflection. The discus shape, the tapering of thickness, forming a non-planar inclined surface renders a perpendicular strike extraordinarily unlikely. Also as previously noted, the broken pieces of a disk impacted are retained by the wrap. Accordingly, the disk must be powdered before it disassociates from the imbricated pattern.

The fibrous layers 120 should be high-tensile strength fibers, such as aramid fibers, polyethylene fibers, e-glass fibers, S2 glass fibers, or a combination of aramid and carbon fibers. In one embodiment fibrous layers 120 are adhesive impregnated, thus, the adhesive on the fabric adheres to the disks that compose the imbricated pattern and retains their relative position. One or more additional layers of the fabric may be added to the sandwich. Some suitable fibrous layers are available with an aggressive adhesive coating covered by a release paper. In addition to being aggressive, it is important that the adhesive once cured remains flexible to reduce separation of the disks and substrate during a ballistic event. The substrate of a desired size may be cut and the release paper peeled back to expose the adhesive surface. The disk can then be laid out directly onto the adhesive which retains them in position relative to one another.

In an alternative embodiment of the invention, a "dry" high tensile strength flexible substrate is provided. It is then coated with a flexible bonding agent, for example, a silicon elastomer resin. The disks may then be laid out as described above. The bonding agent is then cured to flexibly retain the relative locations of the disks. A similarly coated layer can be used to sandwich the imbricated pattern from the opposite side. It is also within the scope and contemplation of the invention to use one layer with a flexible bonding agent while a facing layer is of the peel and stick variety described above. As used herein, "adhesive impregnated substrate" refers to suitable flexible high tensile strength material having an adhesive disposed on one side, whether commercially available with adhesive in place or coated later as described above.

Because the armor system for many of the desired armoring applications is likely to be exposed to a broad range of chemical agents, and particularly petroleum-based products such as gasoline, fuel oil, hydraulic fluid, etc., the external surface of the armor is formed of a chemically resistant layer of elastomer 130 which in one embodiment may be a petroleum-based elastomer. In another embodiment the elastomer is silicone-based elastomer. Where the armor system is used for a structure, such as within a wall where exposure to such chemical agents is unlikely, the elastomer layer may be omitted from one or both sides.

FIG. 3 is a sectional view of the armor system of one embodiment of the invention. Wrapped disks 110, including ceramic or, for example, powered titanium disk 100 wrapped in a suitable wrap 102, are laid out to overlap adjacent disks. The tapering design intrinsic to the discus shape of the disk renders the disk surface non-planar, providing a slope to deflect ballistic impacts as compared with a uniform flat planar surface. An aggressive adhesive 140 adheres the disks in a laid-out pattern, and to fibrous layer 120. As previously noted, the fibrous layer 120 may be an aramid fabric or a fabric of a composite of carbon and aramid fibers or composites of e-glass or S2 glass fibers. An elastomeric layer 130 seals the external surfaces of the armor panel.

FIG. 4 is a sectional view of an alternative embodiment of the invention. Again, the disks 110 are laid out in the adhered interposition by an aggressive adhesive 140, coupled to a fibrous substrate 150. Again, fibrous substrate 150 may be a ballistic grade cloth, such as aramid fabric; e-glass or S2 glass fiber composite; or an aramid/carbon fiber composite. A second fibrous layer 160, which may be elastomer impregnated, adheres to fibrous layer 150. Fibrous layer 160 may, for example, be composed entirely of elastomer-impregnated carbon fibers. An elastomer external layer 130 is again applied to the external surfaces. It is within the scope and contemplation of the invention to add additional layers of fibrous material and/or elastomeric layers as needed for a particular application.

FIG. 5 is a schematic view of a vehicle side section to be armored. Vehicle 200 may be armored with multiple panels, such as panel 210 and 220, corresponding to the quarter panel in the door of vehicle 200. Notably, the imbricated pattern may be laid out into any desired shape to accommodate the contours of any particular vehicle, vessel or aircraft to be armored. Alternatively, the armor can be constructed in a blanket that can be laid over an arbitrary object. The panel may be produced in flexible or rigid form factors. Each armor subsection, 210, 220, may be coupled to rigid or semi-rigid attachment points on the vehicle. For example, the armor panel 210 or 220 may be provided with a perforation at the corners which may be inserted over a post on the vehicle and tightened down with a nut. For purposes of armoring structures, more permanent attachment, such as within a wall, may be used.

The panels may be of an arbitrary size in addition to an arbitrary shape. Smaller panels result in a relatively lower replacement cost in the event of damage to the singular panels. However, smaller panels require a larger number of individual panels to armor an entire vehicle and somewhat increased costs of initial armoring. Using the described layout, it has been found that a significantly-improved repeat hit capability can be achieved over existing techniques. For example, while traditional armor for a 10"×12" plate has a maximum repeat hit capability of three hits, a 10"×12" panel using the described armoring process has exhibited repeat hit capability of up to twenty-three hits. This improved repeat hit capability vastly improves the safety and surviveability of a vehicle, vessel, or aircraft armored using the above-described techniques.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An armor panel comprising:
    a plurality of discus-shaped disks;
    a plurality of wraps, each wrap encasing a disk; and
    an adhesive impregnated substrate coupled to the encased disks to retain them in an imbricated pattern.

2. The armor panel of claim 1 wherein the imbricated pattern has an arbitrary shape.

3. The armor panel of claim 1 wherein the disks each have a diameter in the range of 1.75" to 4.5".

4. The armor panel of claim 1 wherein the adhesive impregnated substrate comprises:
    a fibrous layer.

5. The armor panel of claim 4 wherein the fibrous layer comprises at least one of aramid fibers, e-glass fibers, S2 glass fibers and carbon fibers.

6. The armor panel of claim 1 further comprising:
    an elastomeric layer forming an outermost layer of the panel.

7. The armor panel of claim 1 wherein the wrap is titanium.

8. The armor panel of claim 7 wherein the wrap has a thickness in the range of 0.020" and 0.080".

9. The armor panel of claim 1 wherein the disks are comprised of one of:
    powdered titanium; an alumina oxide; a barium titanate; a strotium titanate; a calcium zirconate; a magnesium zirconate; a silicon carbide and a boron carbide.

10. A method of making an armor panel comprising:
    encasing a plurality of discus-shaped disks each individually in a wrap;
    laying out the plurality of disks in an imbricated pattern; and
    adhering a substrate to each of a first side and a second side of the imbricated pattern.

11. The method of claim 10 wherein encasing comprises:
    adhering a first portion of the wrap to a first side of a disk;
    adhering a second portion of the wrap to a second side of the disk; and
    welding the first portion of the wrap to the second portion of the wrap.

12. The method of claim 11 wherein the wrap is titanium.

13. The method of claim 10 wherein the wrap is a fibrous material covering all surfaces of the wrapped disk.

14. The method of claim 10 wherein the substrate comprises a fibrous layer.

15. The method of claim 10 further comprising:
    applying an elastomeric layer as an outermost layer of the armor panel.

* * * * *